United States Patent [19]

Saitoh et al.

[11] 4,332,858

[45] Jun. 1, 1982

[54] MULTI-LAYER LAMINATE COMPRISING A MODIFIED STYRENE-BUTADIENE BLOCK COPOLYMER

[75] Inventors: Akira Saitoh, Fujisawa; Akio Yamori; Toshio Ibaragi, both of Kawasaki, all of Japan

[73] Assignee: Asahi Kasei Kogyo Kabushiki Kaisha, Osaka, Japan

[21] Appl. No.: 106,943

[22] Filed: Dec. 26, 1979

[30] Foreign Application Priority Data

Dec. 27, 1978 [JP] Japan .................. 53-160021

[51] Int. Cl.$^3$ .................. B32B 9/04; B32B 27/10
[52] U.S. Cl. .................. 428/412; 428/441; 428/476.3; 428/517; 428/495; 428/519; 525/285; 525/301
[58] Field of Search .................. 525/285, 301; 428/462, 428/495, 517, 519, 412, 441, 476.3

[56] References Cited

U.S. PATENT DOCUMENTS 3,714,295  1/1973  Nakayama ..................... 260/879
3,919,035  11/1975  Warrach ........................ 428/519
3,970,771  7/1976  Davison ......................... 428/519

FOREIGN PATENT DOCUMENTS 2017894  5/1970  France .
2375983  1/1977  France .
1260897  1/1972  United Kingdom .

OTHER PUBLICATIONS

Information Chimie No. 171, p. 355, Morisset Nov. 1977.

*Primary Examiner*—George F. Lesmes
*Assistant Examiner*—E. Rollins Buffalow
*Attorney, Agent, or Firm*—Birch, Stewart, Kolasch & Birch

[57] ABSTRACT

A multi-layer laminate comprising at least one A-B double layer structure, characterized in that said layer A is a layer comprising at least one material selected from the group consisting of olefin polymers, polyamide polymers, acrylate polymers, polyether polymers, polycarbonate polymers, polyurethane polymers, vinylidene chloride polymers, thermosetting resins, vulcanized rubbers, glass and papers and said layer B is a layer comprising mainly a modified block copolymer in which an unsaturated carboxylic acid or its derivative is grafted on a styrene-butadiene block copolymer. Said laminate is excellent in interlaminar adhesion, i.e. peeling strength.

1 Claim, No Drawings

MULTI-LAYER LAMINATE COMPRISING A MODIFIED STYRENE-BUTADIENE BLOCK COPOLYMER

BACKGROUND OF THE INVENTION

1. FIELD OF THE INVENTION

This invention relates to a novel laminate. More particularly, this invention relates to a laminate improved in interlaminar adhesion.

2. DESCRIPTION OF THE PRIOR ART

Hitherto, a number of attempts have been made to prepare various laminates either by bonding different materials to each other with the aim of giving the laminates the advantages of both materials or by putting one material between layers of another material with the aim of compensating the fault of the outer layer material. As materials for such laminates, there are used metallic foils such as aluminum foil or copper foil, paper and cellophane, as well as various thermoplastic resins such as polyethylene, polypropylene, ethylene-vinyl acetate copolymer, ethylene-vinyl alcohol copolymer, polyvinyl chloride, nylon, polycarbonate, polystyrene, high impact polystyrene, polyvinylidene chloride, ABS resin, and the like. These laminates are used in the form of a sheet, film, blow-minded article or the like.

These laminates are generally prepared by bonding sheets or films of the same material or different materials with a binder or by co-extruding the same material or different materials without using any binder.

Sometimes, however, a sufficient adhesion effect cannot be obtained with some kinds of materials to be laminated or some combinations of materials to be laminated. Particularly when a laminate is prepared by co-extrusion without using any binder, materials lacking mutual adhesion cannot be used. Therefore, when it is intended to prepare a laminate from materials lacking mutual adhesion by co-extrusion, a material having adhesiveness to both the materials is used as an adhesive layer. As such an adhesive material, there are used, for example, ethylene-vinyl acetate copolymer, ionomer resin, styrene-butadiene block copolymer and the like. However, these materials still have problems in that adhesion effects are not necessarily sufficient when some kinds of materials are co-extruded and the resulting laminates are inferior in durability of adhesion, water-resistance, and the like.

SUMMARY OF THE INVENTION

The present inventors have studied these problems to find that a modified block copolymer in which an unsaturated carboxylic acid or its derivative is grafted on a styrene-butadiene block copolymer is quite excellent in adhesion to various materials and suitable for use in laminates.

According to this invention, there is provided a multi-layer laminate comprising at least one A-B double layer structure, characterized in that said layer A is a layer comprising at least one material selected from the group consisting of olefin polymers, polyamide polymers, acrylate polymers, polyether polymers, polycarbonate polymers, polyurethane polymers, vinylidene chloride polymers, thermosetting resins, vulcanized rubbers, glass and papers and said layer B is a layer comprising mainly a modified block copolymer in which an unsaturated carboxylic acid or its derivative is grafted on a styrene-butadiene block copolymer.

DETAILED DESCRIPTION OF THE INVENTION

The modified block copolymer in which an unsaturated carboxylic acid or its derivative is grafted on a styrene-butadiene block copolymer (hereinafter referred to as "modified block copolymer") which forms the layer B in this invention will be mentioned below. The styrene-butadiene block copolymer (hereinafter referred to as "block copolymer") used as a base for said modified block copolymer has at least one, preferably two or more, polymer blocks composed mainly of styrene and at least one polymer block composed mainly of butadiene. In said block copolymer, the weight ratio of styrene to butadiene is preferably within the range of 10/90–90/10, more preferably 20/80–90/10, and most preferably 20/80–85/15. In the polymer block composed mainly of styrene of said block copolymer, the weight ratio of styrene to butadiene is preferably within the range of 100/0–60/40, more preferably 100/0–80/20, and most preferably 100/0, and the distribution of the minor constituent butadiene in the molecular chain may be any of the random, tapered (the monomer constituent increases or decreases along the molecular chain) and partially blockwise distributions or a combination thereof. In the polymer block composed mainly of butadiene, the weight ratio of styrene to butadiene is preferably within the range of 0/100–40/60, more preferably 0/100–30/70, and the distribution of minor constituent styrene in the molecular chain may be any of the random, tapered and partially block-wise distributions or a combinations thereof.

In this invention, the weight ratio of the polymer block composed mainly of styrene to the polymer block composed mainly of butadiene is preferably in the range of 10/90–90/10, more preferably 15/85–85/15.

When said block copolymer contains two or more polymer blocks composed mainly of styrene or two or more polymer blocks composed mainly of butadiene, each of the blocks may be identical or different in structure.

A part of the styrene constituting the block copolymer of this invention may be replaced by other vinyl aromatic compounds such as α-methylstyrene, vinyltoluene or the like, so long as the characteristic properties of the block copolymer are not changed.

Said block copolymer has preferably a number average molecular weight of 10,000–1,000,000, more preferably 20,000–500,000, and most preferably 30,000–300,000. The molecular weight distribution (ratio of weight average molecular weight to number average molecular weight) is preferably within the range of 1.01–10, more preferably 1.01–5.

The molecular structure of said block copolymer may be any of the straight chain structure, branched chain structure, radial structure and their combinations.

The above-mentioned various limitations on block copolymer are very important in order for said block copolymer to have a sufficient ability of adhesion to other materials after it is modified.

The block copolymer used in this invention is usually obtained by anionic-block copolymerizing styrene and butadiene in an inert hydrocarbon solvent such as hexane, cyclohexane, benzene, toluene or the like in the presence of an organolithium compound such as butyllithium as a polymerization catalyst. It is also possible to prepare a branched or radial block copolymer by reacting the block copolymer having an active lithium end obtained by said method, with a polyfunctional coupling agent such as carbon tetrachloride, silicon tetrachloride or the like. Any block copolymers obtained by any preparation methods other than the above may be used as a base for the modified block copolymer of this invention, unless they exceed the above-mentioned limits.

Said block copolymer may be used not only alone but also in combination of two or more. Examples of such combinations include a combination of two or more styrene-butadiene block copolymers having different molecular weights, a combination of two or more styrene-butadiene block copolymers different in styrene content, a combination of styrene-butadiene block copolymers different in block structure, i.e., a styrene-butadiene block copolymer, the block structure of which is of styrene-butadiene type, and a styrene-butadiene block copolymer, the block structure of which is of styrene-butadiene-styrene type, and other combinations.

As the styrene-butadiene block copolymer used as a base for the modified block copolymer used in the laminate of this invention, straight chain block copolymers containing two polymer blocks composed mainly of styrene and two polymer blocks composed mainly of butadiene are particularly preferable, taking the processability at the time of lamination into consideration.

Styrene-isoprene block copolymers cannot be used as a base for the modified block copolymer used in this invention, because if they are used, the modified block copolymer obtained tends to undergo deterioration due to thermal history, and its application to in a laminate configuration produces problems.

Examples of the unsaturated carboxylic acid which is grafted on the block copolymer of this invention to form the modified block copolymer include maleic acid, fumaric acid, itaconic acid, acrylic acid, methacrylic acid, crotonic acid, cis-4-cyclohexene-1,2-dicarboxylic acid, endo-cis-bicyclo[2,2,1]-5-heptene-2,3-dicarboxylic acid and the like, and, as their derivatives, there may be mentioned acid anhydrides, esters, acid amides, dicarboxylic acid imides and the like of these carboxylic acids, among which dicarboxylic acid anhydrides are preferable and maleic anhydride is particularly preferred.

The content of unsaturated carboxylic acid or its derivative in the modified block copolymer of this invention is preferably 0.05–5% by weight. If it is less than 0.5% by weight the improvement of adhesion is hardly observable, and if it exceeds 5% by weight the adhesion is not significantly greater than that obtained by using a smaller amount of the modifier. In order to keep the flow property of modified block copolymer comparable to that of unmodified block copolymer, the content of unsaturated carboxylic acid or its derivative is more preferably in the range of 0.05–2% by weight. In order to prevent foaming from occurring at the time of melt-processing due to the absorbed atmospheric water in the modified block copolymer, said content is must preferably in the range of 0.05–1% by weight.

Although the modified block copolymer used in this invention has a small content of unsaturated carboxylic acid or its derivative as mentioned above, it is greatly improved in adhesion as compared with unmodified block copolymer, and other properties such as melt flow property, solubility in solvent, etc. are substantially the same as those of unmodified block copolymer so that it can be processed under substantially the same conditions as in the prior techniques. This is a characteristic feature of this invention.

The fact that grafting the unsaturated carboxylic acid or its derivative falling in the range of this invention on a styrene-butadiene block copolymer is effective for obtaining a polymer useful as an adhesive layer is not predictable from the prior art at all.

The modified block copolymer of this invention can be produced by grafting an unsaturated carboxylic acid or its derivative on said block copolymer in the molten state or the solution state with or without a radical initiator. Although the process for producing the modified block copolymer is not particularly limited in this invention, some production processes are not desirable which give a modified block copolymer containing an undesirable component such as gel or the like or give a modified block copolymer, the melt viscosity of which increases so markedly as to lower the processability. One of the preferable processes is to react a block copolymer with an unsaturated carboxylic acid or its derivative in an extruder under such melt mixing conditions as to generate substantially no radical.

The modified block copolymers for forming the layer B in this invention may be used not only alone but also in combination of two or more. In the layer B, the modified block copolymer is preferably contained in a proportion of 60% by weight, more preferably 75% by weight, most preferably nearly 100% by weight for the sake of retaining adhesion. Into the modified block copolymer of layer B may be incorporated antioxidant, stabilizer, ultraviolet absorber, colorant and the like. Further, various thermoplastic resins, unvulcanized rubber, plasticizer and other additives may also be incorporated thereinto so long as they do not adversely affect the adhesion of the modified block copolymer.

On the other hand, in this invention, the layer A forming a multi-layer laminate comprising at least one A-B double layer structure together with the layer B composed mainly of the modified block copolymer is a layer comprising at least one material selected from the group consisting of olefin polymers, polyamide polymers, acrylate polymers, polyether polymers, polycarbonate polymers, polyurethane polymers, vinylidene chloride polymers, thermosetting resins, vulcanized rubbers, glass and papers. The modified block copolymer contained in layer B of this invention has an excellent adhesion to any of these materials for forming the layer A.

The term "olefin polymers" used herein means homopolymers of olefin monomers such as ethylene, propylene, 1-butene, 2-butene, iso-butene, 1,3-butadiene and the like; copolymers of two or more different olefin monomers; copolymers of said olefin monomers and other monomers; and modified products of these polymers. Examples of said homopolymers of olefin monomers include low density polyethylene, medium density polyethylene, high density polyethylene, polypropylene, polybutene, 1,2-polybutadiene and the like. Examples of said copolymers include ethylene-propylene copolymer, ethylene-butene copolymer, ethylene-vinyl acetate copolymer, ethylene-vinyl alcohol copolymer, ethylene-acrylic acid copolymer and the like. Examples of said modified products include ionomer (ion-cross-linked ethylene-methacrylic acid copolymer), chlorosulfonated polyethylene, chlorinated polyethylene and the like.

The term "polyamide polymers" used herein means polycondensates of diamines and dicarboxylic acids, polycondensates of aminocarboxylic acids, and ring-opened polymers of cyclic lactams. Examples of said polyamide polymers include nylon 6, nylon 6,6, nylon 11, nylon 12, nylon 6-nylon 6,6 copolymer and the like.

The term "acrylate polymers" used herein means homopolymers and copolymers of acrylic esters or methacrylic esters. Their examples include polymethyl methacrylate, polybutyl methacrylate, methyl methacrylate-methyl acrylate copolymer, and the like.

The term "polyether polymers" used herein means polymers having ether linkages in molecule. Their examples include polyacetal, polyethylene oxide, polypropylene oxide, polyphenylene ether and the like.

The term "polycarbonate polymers" used herein means polymers obtained by the reaction of Bisphenol A with phosgene or diphenyl carbonate.

The term "polyurethane polymers" used herein means thermoplastic polymers having urethane linkages in molecule. They include polyaddition products of diisocyanates and diols.

The term "vinylidene chloride polymers" used herein means homopolymers of vinylidene chloride and copolymers of vinylidene chloride and other monomers.

The term "thermosetting resins" used herein means resins curable upon heating such as phenolic resin, alkyl resin, epoxy resin, unsaturated polyester resin, amino resin, urea resin and the like.

The term "vulcanized rubber" used herein means vulcanized products of natural rubber, polybutadiene rubber, styrene-butadiene rubber, acrylonitrilebutadiene rubber, polyisoprene rubber, polychloroprene rubber and compositions of these rubbers and various fillers.

The term "papers" used herein means generally called paper as well as cellophane.

The laminate of this invention is a multi-layer laminate comprising at least one A-B double layer structure. When the multi-layer laminate has three or more layers, a layer or layers other than the double layer must be materials which can adhere to layer A or layer B. Particularly, layer B has a good adhesion to various materials, so that it is useful as an adhesive layer when combined with other materials to give a laminate of A-B-C three layers.

Examples of the materials for use in layer C and adherable to layer B include olefin polymers, styrene polymers (they include homopolymer of styrene and copolymers of styrene and other monomers, and their examples include polystyrene, high impact polystyrene, styrene-acrylonitrile copolymer, ABS resin and MBS resin), polyamide polymers, acrylate polymers, polyether polymers, polycarbonate polymers, vinyl chloride polymers [homopolymer of vinyl chloride and copolymers of vinyl chloride and other monomers (soft products containing a plasticizer are also included)], vinylidene chloride polymers, various thermosetting resins, various vulcanized rubbers, glass, papers, metals such as aluminum, brass, copper, tin and the like, wood, woven fabrics, non-woven fabrics and the like.

As mentioned above, the modified block copolymer used in layer B has adhesiveness to many kinds of materials, so that various combinations of multi-layer laminates, which have hitherto been difficult to obtain, can be obtained by using said layer B as an adhesive layer, which is another characteristic feature of this invention.

For example, a three-layer laminate having a gas barrier property and a steam barrier property, with excellent mechanical strength and having a sufficient interlaminar adhesion can be obtained by using, in this invention, the so-called gas barrier type material such as polyamide polymer (for example, nylon 6, nylon 6,6 or the like), ethylene-vinyl alcohol copolymer, polyvinylidene chloride or the like as layer A, using layer B as an adhesive layer, and using aluminum or a general purpose resin such as polyethylene, polypropylene, polystyrene, high impact polystyrene or the like as layer C. The laminate of this invention obtained by combining said gas barrier type material with a general purpose resin or aluminum is excellent in interlaminar adhesion, whereas the use of hitherto known adhesives or adhesive polymers did not always give a sufficient interlaminar adhesion which was a problem from a practical point of view. The modified block copolymer of this invention has an excellent adhesion to both the layers, so that it gives a useful laminate.

Further, in this invention, the modified block copolymer of layer B is resinous when the base styrene-butadiene block copolymer has a styrene content of 65% by weight or more and preferably 70% by weight or more. Thus, by using, in an A-B two-layer laminate, a gas barrier polymer such as nylon 6, nylon 6,6, ethylene-vinyl alcohol copolymer or the like as layer A and the above-mentioned resinous modified block copolymer as layer B, there can be obtained a laminate having a two-layer structure, having a gas barrier property and a steam barrier property and being excellent in mechanical strengths such as impact strength.

As the process for producing these laminates, any of the processes generally employed can be utilized. Examples of the processes which may be used include extrusion lamination process which comprises forming the modified block copolymer used in this invention into a hot molten film with an extruder, and subsequently pressing and bonding the film onto a substrate material; co-extrusion process which comprises heating and melting the modified block copolymer of this invention and a substrate in separate extruders and then laminating them in a multi-layer die; a process which comprises previously forming the modified block copolymer of this invention into a film or a sheet, putting it on a substrate and then heating and pressing the resulting assembly by means of a hot press or the like to bond the film or sheet to the substrate; hot lamination process which comprises heating and melting the modified block copolymer of this invention, and subsequently coating it onto a film-formed substrate by extrusion method, casting method or the like; dry lamination process which comprises dissolving the modified block copolymer of this invention in a solvent, coating the solution onto a substrate, evaporating off the solvent and then heating and pressing the assembly to bond the modified block copolymer to the substrate; wet lamination process which comprises using a latex obtained by dispersing the modified block copolymer of this invention in water by use of an appropriate emulsifier; and the like, though other processes may also be employed. Among the processes mentioned above, hot melt bonding processes such as extrusion lamination, co-extrusion, hot lamination, pressing and the like are particularly preferable from a viewpoint of easiness of bonding operation, because the modified block copolymer of this invention exhibits a sufficient bonding strength if a pressure of 0.1–100 kg/cm$^2$ is applied thereto at a temperature of 100°–280° C. for a period of about 2 seconds to 20 minutes. Dry lamination process is also one of the preferable processes, because the modified block copolymer of this invention is quite readily soluble in general purpose solvents such as toluene, xylene, cyclohexane, tetrahydrofuran, butyl acetate and the like and gives low viscosity solutions at a concentration of 2-70%.

As the material for forming these laminates, surface-treated materials may also be used for the sake of enhancing adhesion.

The amount of modified block copolymer used in the laminates may be such that the laminates can have a sufficient performance of adhesion. However, when the modified block copolymer is used for the purpose of giving the laminates a special function such as impact resistance, flexibility or the like, an amount enough to display the function is necessary.

The laminates obtained by the process of this invention can be put to wide uses including package film in the form of a film or sheet and co-extruded double layer materials for moldings such as blow molding, vacuum forming and air-pressure forming.

DESCRIPTION OF THE PREFERRED EMBODIMENTS

A few examples are shown below, but this invention is not limited thereto.

Example 1

By the procedure mentioned below, there was obtained a modified block copolymer in which maleic anhydride was grafted on a styrene-butadiene copolymer. It had a butadiene-styrene-butadiene-styrene block, a styrene content of 38% by weight and a number average molecular weight of 60,000.

To 100 parts by weight of said styrene-butadiene copolymer were added 1.5 parts by weight of maleic anhydride and 0.2 part by weight of phenothiazine, and they were uniformly mixed by means of a mixer.

The mixture was fed to a single screw extruder (screw diameter (D)=40 mm, L/D=24 (L: screw length), full-flighted screw) in an atmosphere of nitrogen and subjected to maleinization reaction at a cylinder temperature of 200° C. The unreacted maleic anhydride was removed from the obtained polymer under a reduced pressure. Results of analyses were: melt index (condition G) 7.2, toluene-insoluble fraction 0.05% by weight, and amount of maleic anhydride grafted 0.70% by weight. This modified block copolymer is referred to as sample A.

On the other hand, maleic anhydride was grafted on a block copolymer having a styrene-butadiene-styrene block, a styrene content of 80% by weight and a number average molecular weight of 90,000 in an extruder in the same manner as above to obtain a modified block copolymer, which is referred to as sample B. Sample B had a melt index of 3.1 (condition G) and contained 0.08% by weight of toluene-insoluble fraction. The amount of maleic anhydride grafted was 0.87% by weight.

Samples A and B were independently formed into a sheet having a thickness of 0.3 mm. The sheets were heated and pressed with various materials shown in Table 1 by means of a press, and the peeling strength was measured according to JIS-K-6854. The results are shown in Table 1. As shown in Table 1, the laminates of the invention had an excellent adhesion.

Comparative Example 1

Laminates were prepared by repeating the procedure of Example 1, except that the same copolymer as that before the modification with maleic acid in Example 1 (referred to hereinafter as unmodified polymer) was used in the process for making sample A in Example 1. Their peeling strengths were measured by the same procedure as in Example 1 to obtain the results shown in Table 1.

TABLE 1

| | | Peeling strength (kg/25 mm) | | |
|---|---|---|---|---|
| Substrate | | Sample A (Example 1) | Unmodified polymer of sample A (Comparative Example 1) | Sample B (Example 1) |
| High density polyethylene | (HDPE) | 4.0 | 2.1 | 3.6 |
| Polypropylene | (PP) | 4.5 | 1.2 | 3.8 |
| Polyvinylidene chloride | (PVDC) | 3.9 | 0.3 | 3.2 |
| Nylon 6 | (N-6) | 8.2 | 1.5 | 8.6 |
| Nylon 6,6 | (N-6,6) | 9.3 | 1.3 | 10.3 |
| Polymethyl methacrylate | (PMMA) | 5.5 | 1.7 | 4.6 |
| Ethylene-vinyl acetate copolymer | (EVA) | 5.0 | 3.0 | 4.3 |
| Ethylene-vinyl alcohol copolymer | (EVAL) | 6.6 | 1.4 | 6.8 |
| Polycarbonate | (PC) | 4.0 | 2.3 | 2.9 |
| Ionomer resin | | 8.5 | 2.6 | — |
| Polyphenylene ether | (PPE) | 7.2 | 2.5 | — |
| Polyurethane | (PU) | 6.6 | 2.4 | — |
| Ethylene methacrylic acid copolymer | (EMAA) | 9.5 | 6.6 | — |
| Cellophane | | Unmeasurable (substrate was broken) | 3.6 | — |
| Kraft paper | | Unmeasurable (substrate was broken) | 6.6 | — |
| Phenolic resin | | 8.2 | 2.1 | — |
| Vulcanized rubber composition (SBR 1712 contained) | | 9.5 | 5.0 | — |

Example 2 and Comparative Example 2

By using a 45-mm extruder, a 40-mm extruder and a 45-mm extruder, co-extrusion of three layers of nylon 6/sample A/high impact polystyrene and three layers of ethylene-vinyl alcohol copolymer/sample B/high impact polystyrene was conducted. For comparison, the same co-extrusion was conducted using the copolymers before the modification of samples A and B. As a result, the interlaminer strengths (peeling strength) were as shown in Table 2. The conditions of extrusion of individual resins were as shown in Tables 3 and 4.

TABLE 2

| | Item | Example 2-1 | Example 2-2 | Comparative Example 2-1 | Comparative Example 2-2 |
|---|---|---|---|---|---|
| Structure of laminate | Layer A | N-6 | EVAL | N-6 | EVAL |
| | Adhesive polymer (layer B) | Sample A | Sample B | Unmodified polymer of sample A | Unmodified polymer of sample B |
| | Layer C | HIPS | HIPS | HIPS | HIPS |
| Peeling strength (gr/25 mm) | | 1,000 | 800 | 125 | 150 |
| Peeling surface | | Layer A/ Layer B | Layer A/ Layer B | Layer A/ Layer B | Layer A/ Layer B |

Note:
N-6: Nylon 6
EVAL: Ethylene-vinyl alcohol copolymer
HIPS: High impact polystyrene

TABLE 3

The co-extrusion conditions in Example 2-1 and Comparative Example 2-1

| Layer | Polymer | Extruder (mm φ) | Cylinder temperature (°C.) | Die temperature (°C.) |
|---|---|---|---|---|
| A | N-6 | 45 | 180–230 | 230 |
| B | Sample A or its unmodified polymer | 40 | 150–200 | 230 |
| C | HIPS | 45 | 150–200 | 230 |

TABLE 4

The co-extrusion conditions in Example 2-2 and Comparative Example 2-2

| Layer | Polymer | Extruder (mm φ) | Cylinder temperature (°C.) | Die temperature (°C.) |
|---|---|---|---|---|
| A | EVAL | 45 | 170–200 | 210 |
| B | Sample B or its unmodified polymer | 40 | 150–200 | 210 |
| C | HIPS | 45 | 150–200 | 210 |

Example 3 and Comparative Example 3

Sample A and, for comparison, the styrene-butadiene block copolymer before the modification of sample A were formed into sheets having a thickness of 0.5 mm by use of a hot press. The sheet was put between soft glass and aluminum and placed in an oven kept at 150° C. for 20 minutes under a load of 0.1 kg/cm² to obtain a three-layer laminate. The peeling strength of this sample was measured to obtain the result shown in Table 5.

As shown in Table 5, the laminate of Example 3 prepared from modified block copolymer is markedly improved in interlaminer strength (peeling strength) as compared with the laminate of Comparative Example 3 prepared from unmodified block copolymer. This demonstrates that the modified block copolymer of this invention has an excellent adhesion to glass.

TABLE 5

| | | No. | |
|---|---|---|---|
| Item | | Example 3 | Comparative Example 3 |
| Structure of laminate | Layer A Adhesive polymer (layer B) | Glass Sample A | Glass Unmodified polymer of sample A |
| | Layer C | Aluminum | Aluminum |
| Peeling strength (kg/25 mm) | | 12.8 | 4.3 |
| Peeling surface | | Layer A/ Layer B | Layer A/Layer B |

Example 4 and Comparative Example 4

By using the commercially available styrene-conjugated diene block copolymers (c-g) shown in Table 6 and the tentatively prepared styrene-butadiene block copolymers (h-i) shown in Table 7, modified block copolymers (C-I) were produced by grafting maleic anhydride thereon by the same procedure as employed in the production of sample A. Analysis values were as shown in Tables 6 and 7.

By using the modified block copolymers C-I as an adhesive layer, the various polyamide polymers shown in Table 8 were bonded to other materials to obtain laminates. The bonding was carried out by pressing the materials at a temperature of 200° C. under a pressure of 20 kg/cm² by means of a hot press. Peeling strengths of these laminates were measured according to JIS-K-6854 to obtain the results shown in Table 8. For comparison, the results in the cases using unmodified block copolymers as adhesive layer are also shown in Table 8.

As shown in Table 8, the modified block copolymers of this invention have an excellent adhesion to polyamide polymers, so that, in the peeling test of laminates, the bonding strength between the adhesive layer and the polyamide polymer is sometimes greater than the bonding strength between adhesive layer and another material and peeling takes place between adhesive layer and another material. In contrast to it, the unmodified block copolymers shown in Comparative Examples exhibit only a slight adhesion to the polyamide polymers.

TABLE 6

| | Symbol | c | d | e | f | g |
|---|---|---|---|---|---|---|
| | Kind | Styrene-butadiene copolymer | Styrene-butadiene copolymer | Styrene-butadiene copolymer | Styrene-butadiene copolymer | Styrene-isoprene copolymer |
| Unmodified block | Trade name | Kraton 1102 (1) | Solprene T-414 (2) | KR-01 (3) | Tufdene 2003 (4) | Kraton 1107 (5) |
| | Styrene | | | | | |

TABLE 6-continued

| copolymer | content (% by wt.) | 28 | 40 | 80 | 25 | 14 |
|---|---|---|---|---|---|---|
| | Melt index (g/10 min.) | 6.7 | 5.2 | 5.3 | 1.8 | 9.6 |

| | | Symbol | C | D | E | F | G |
|---|---|---|---|---|---|---|---|
| Modified block copolymer | Amount of maleic anhydride grafted (% by wt.) | | 1.20 | 0.50 | 0.83 | 0.23 | 0.56 |
| | Melt index (g/10 min.) | | 3.5 | 4.0 | 3.1 | 1.0 | 9.8 |

Notes
(1) Manufactured by Shell Co.
(2) Manufactured by Phillips Corp.
(3) Manufactured by Phillips Corp.
(4) Manufactured by Asahi Kasei Kogyo K.K.
(5) Manufactured by Shell Co.

TABLE 7

| | | Symbol | h | i |
|---|---|---|---|---|
| | | Kind | Styrene-butadiene copolymer | Styrene-butadiene copolymer |
| Unmodified block copolymer | Structure of polymer | Arrangement of blocks Weight,(1) structure and monomer contents of each block | $B_1$—$S_1$—$B_2$—$S_2$<br>$B_1$ = 10% ([B]/[S] = 8/2, random)<br>$S_1$ = 25% ([B]/[S] = 5/20, random)<br>$B_2$ = 40% ([B]/[S] = 32/8, random)<br>$S_2$ = 25% ([B]/[S] = 5/20, random) | $S_1$—$B_1$—$S_2$<br>$S_1$ = $S_2$ = 15% (styrene only)<br>$B_1$ = 70% (butadiene only)<br>Micro-structure of $B_1$:<br>1,4-cis bond = 21%<br>1,2-vinyl bond = 30% |
| | | Styrene content (% by wt.) | 50 | 30 |
| | | Melt index (g/10 min) | 8.3 | 1.3 |
| Modified block copolymer | Symbol | | H | I |
| | Amount of maleic acid grafted (% by wt.) | | 0.73 | 0.36 |
| | Melt index (g/10 min.) | | 6.2 | 1.1 |

Notes (1)
$B_n$: Polymer block composed mainly of butadiene (n represents the order along molecular chain)
$S_n$: Polymer block composed mainly of styrene.
[B]: Content of butadiene (weight % based on total polymer).
[S]: Content of styrene (weight % based on total polymer).

TABLE 8

| | Item | Example 4-1 | Example 4-2 | Example 4-3 | Example 4-4 | Example 4-5 | Example 4-6 | Example 4-7 | Comparative Example 4-1 | Comparative Example 4-2 | Comparative Example 4-3 | Comparative Example 4-4 |
|---|---|---|---|---|---|---|---|---|---|---|---|---|
| Structure of laminate | Layer A (polyamide) | N-6 | N-6,6 | N-12 | N-6 | N-6 | N-6 | N-6 | N-6 | N-12 | N-6 | N-6 |
| | Adhesive layer plymer (layer B) | C | C | D | E | F | H | I | c | d | e | h |
| | Layer C | HIPS | HIPS | HDPE | HIPS | HDPE | HIPS | HDPE | HIPS | HDPE | HIPS | HIPS |
| Results of peeling test | Peeling strength (kg/25 mm) | 16.3 | 14.5 | 5.8 | 10.3 | 4.5 | 9.5 | 4.3 | 0.7 | 0.5 | 0.1 | 0.1 |
| | Peeling surface | Layer A/Layer B | Layer A/Layer B | Layer B/Layer C | Layer A/Layer B | Layer A/Layer B | Layer A/Layer B | Layer B/Layer C | Layer A/Layer B | Layer A/Layer B | Layer A/Layer B | Layer A/Layer B |

(Abbreviations)
N-6: Nylon 6 (unstretched sheet having a thickness of 0.2 mm)
N-6,6: Nylon 6,6 (unstretched sheet having a thickness of 0.2 mm)
N-12: Nylon 12 (unstretched sheet having a thickness of 0.2 mm)
HIPS: High impact polystyrene (a sheet having a thickness of 1.0 mm)
HDPE: High density polyethylene (a sheet having a thickness of 1.0 mm)

Example 5 and Comparative Example 5

Laminates were prepared by using the samples shown in Table 10 in the same manner as in Example 4 or Comparative Example 4. In order to examine the maintenance of their peeling strengths, the samples were allowed to stand in an oven kept at 150° C. for 3 hours and then their peeling strengths were measured. The results are shown in Table 9.

As shown in Table 9, laminates prepared from the modified block copolymers containing butadiene as conjugated diene component can sufficiently retain their peeling strength. However, as shown in Comparative Example 5-2 in Table 9, the use of styrene-isoprene block copolymer (sample G) results in a marked decrease of peeling strength, which is a problem from a practical point of view.

TABLE 9

| | Item | | Example 5-1 | Example 5-2 | Comparative Example 5-1 | Comparative Example 5-2 |
|---|---|---|---|---|---|---|
| Structure of laminate | Layer A (polyamide) | | N-6 | N-6 | N-6 | N-6 |
| | Adhesive layer polymer (layer B) | | C | E | c | G |
| | Layer C | | Aluminum | Aluminum | Aluminum | Aluminum |
| Results of peeling test | Before heating | Peeling strength (kg/25 mm) | 15.8 | 10.5 | 0.7 | 10.8 |
| | | Peeling surface | Layer A/ Layer B | Layer A/ Layer B | Layer A/ Layer B | Layer A/ Layer B |
| | After heating | Peeling strength (kg/25 mm) | 14.8 | 9.7 | 0.4 | 4.5 |
| | | Peeling surface | Layer A/ Layer B | Layer A/ Layer B | Layer A/ Layer B | Layer A/ Layer B |
| | Maintenance of peeling strength (%) | | 94 | 92 | 57 | 42 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multi-layer laminate comprising at least one A-B double layer structure, characterized in that said layer A is a layer comprising at least one material selected from the group consisting of olefin polymers, polyamide polymers, acrylate polymers, polyether polymers, polycarbonate polymers, polyurethane polymers, vinylidene chloride polymers, thermosetting resins, vulcanized rubbers, glass and papers and said layer B is a layer consisting essentially of a modified block copolymer in which an unsaturated dicarboxylic acid or its anhydride selected from the group consisting of maleic acid, fumaric acid and maleic anhydride is grafted on a styrene-butadiene block copolymer containing two or more polymer blocks composed mainly of styrene and one or more polymer blocks composed mainly of butadiene, the weight ratio of styrene to butadiene in said styrene-butadiene block copolymer being in the range of 20/80-85/15 and the content of said unsaturated dicarboxylic acid or its anhydride in the modified block copolymer being 0.05%-1% by weight.

* * * * *